(12) United States Patent  (10) Patent No.: US 6,304,709 B1
Fujita  (45) Date of Patent: Oct. 16, 2001

(54) VARIABLE OPTICAL ATTENUATOR AND WAVELENGTH-MULTIPLEXED OPTICAL TRANSMISSION SYSTEMS USING THE SAME

(75) Inventor: Masayuki Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/066,684

(22) Filed: Apr. 28, 1998

(30) Foreign Application Priority Data

May 7, 1997 (JP) .................................................. 9-117204

(51) Int. Cl.[7] .................................................. G02B 6/26
(52) U.S. Cl. .............................. 385/140; 385/33; 385/25; 385/18; 385/47
(58) Field of Search .............................. 385/140, 18, 33, 385/47, 36, 25, 122

(56) References Cited

U.S. PATENT DOCUMENTS

| 5,226,104 | * | 7/1993 | Unterleitner et al. | 385/140 |
| 6,137,941 | * | 10/2000 | Robinson | 385/140 |

FOREIGN PATENT DOCUMENTS

| Sho 54-121145 | 9/1979 | (JP) . |
| Sho 55-33129 | 3/1980 | (JP) . |
| 57-122403 | 7/1982 | (JP) . |
| 63-82214 | 5/1988 | (JP) . |
| Hei 2-58721 | 4/1990 | (JP) . |
| 3-257414 | 11/1991 | (JP) . |
| 8-94843 | 4/1996 | (JP) . |

* cited by examiner

Primary Examiner—Phan T. H. Palmer
(74) Attorney, Agent, or Firm—McGuireWoods LLP

(57) ABSTRACT

A variable optical attenuator with a first optical fiber has a mirror reflecting a light beam emitted from the end face of the first fiber; a second optical fiber arranged parallel to the first fiber, on which second fiber the emitted light beam reflected by the mirror is incident; and a position adjustment unit for adjusting the distance between the mirror and the end face of the first fiber. The structure includes a beam-converging lens between the end face and the mirror for converging the light beam emitted from the end face onto the mirror. The position adjustment unit includes a cylinder housing the mirror and having screws on the outer diameter portion thereof; and a box-shaped member housing the first fiber and the second fiber and having screws with which the cylinder is fitted onto the inner diameter portion. The distance between the mirror and the first fiber is adjustable by rotating the cylinder. An optical signal source for wavelength-multiplexed optical transmission systems includes multiple optical signal sources emitting light beams having different wavelengths; multiple variable optical attenuators arranged before multiple optical signal sources; and a photo-coupler composing light beams from the variable optical attenuators.

18 Claims, 3 Drawing Sheets

VARIABLE OPTICAL ATTENUATOR AND WAVELENGTH-MULTIPLEXED OPTICAL TRANSMISSION SYSTEMS USING THE SAME

BACKGROUND OF THE INVENTION

1. Field of the Invention

The present invention relates to a variable optical attenuator for use in optical communication and to an optical signal source for wavelength-multiplexed optical transmission systems.

2. Description of the Related Art

Conventionally, there has been known a variable optical attenuator having a structure in which the distance between ferrules opposed each other is changed to thereby vary optical coupling efficiency between the ferrules (see Japanese Unexamined Patent Application No. 8-94843). Also known are a variable optical attenuator having a structure utilizing the dependency of the intensity of a damped wave at the interface between different types of optical transmission mediums on the light incidence angle (Japanese Unexamined Patent Application No. 57-122403), that having a structure in which a disk-shaped optical filter having an attenuation factor varying in a sector manner is inserted into an optical path (Japanese Unexamined Patent Application No. 3-257414) and that having a structure in which two optical fibers arranged in parallel are optically coupled through a reflection mirror and an attenuation plate is inserted between the optical fiber and the reflection mirror (U.S. Pat. No. 5,226,104).

Conventional variable optical attenuators are provided with mechanisms for adjusting optical attenuation at positions perpendicular to the optical axes of optical fibers, respectively. If a plurality of variable optical attenuators are mounted on, for example, the panel of an apparatus, it is necessary to provide clearances between adjacent variable optical attenuators for operating the adjustment mechanism. This makes it difficult to realize high-density mounting. For the same reason, once the variable optical attenuators are mounted on the panel of the apparatus, it is impossible to adjust optical attenuation from the outside of the panel. Due to this, maintenance becomes difficult.

In case of a wavelength-multiplexed optical transmission system for transmitting a light beam after composing a plurality of signal lights having different wavelengths, in particular, there is only a narrow space in the panel. For that reason, it is required to easily mount and adjust the variable optical attenuators. It is also required to accurately keep output levels of the light beams of different wavelengths coincide with one another.

SUMMARY OF THE INVENTION

It is therefore an object of a variable optical attenuator and an optical signal source for wavelength-multiplexed optical transmission systems according to the present invention to realize high-density mounting. It is another object of the present invention to make it possible to easily adjust optical attenuation even after mounting the attenuator on, for example, the panel of the apparatus.

A variable optical attenuator according to the present invention comprises: a first optical fiber; a reflection mirror reflecting a light beam emitted from an end face of the first optical fiber; a second optical fiber arranged parallel to the first optical fiber, on which second optical fiber the emitted light beam reflected by the reflection mirror is incident; and position adjustment means for adjusting a distance between the reflection mirror and the end face.

The variable optical attenuator according to the present invention further comprises beam converging means arranged between the end face and the reflection mirror, for converging the light beam emitted from the end face onto the reflection mirror. The position adjustment means comprises a cylinder housing the reflection mirror and having screws at an outer diameter thereof; and a box-shaped member housing the first optical fiber and the second optical fiber and having screws for fitting the cylinder into an inner diameter thereof. The distance is adjusted by rotating the cylinder.

Two optical fibers and the lens are fixed to the box-shaped member. The relative positions of these elements are not changed. The reflection mirror is fixed to the cylinder. The cylinder is inserted into a hole provided in the box-shaped member. The cylinder is rotatable within the hole. In this case, if the structure is such that the cylinder is fitted into the hole of the box-shaped member with screws, the distance between the reflection mirror and the optical fibers is changed by the rotation of the cylinder. Owing to this, the optical coupling amount between the optical fibers, i.e., optical attenuation is changed.

A variable optical attenuator according to the present invention comprises: a first optical fiber; a reflection mirror reflecting a light beam emitted from an end face of the first optical fiber; a second optical fiber arranged parallel to the first optical fiber, on which second optical fiber the emitted light bean reflected by the reflection mirror is incident. With the structure stated above, the reflection mirror includes a reflection film having a reflection factor varying according to a light incidence position. The variable optical attenuator further comprise irradiation position adjustment means for changing a position at which the light beam emitted from the end face is irradiated with the reflection mirror.

The variable optical attenuator according to the present invention further comprises beam converging means, arranged between the end face and the reflection mirror, for converging the light beam emitted from the end face onto the reflection mirror. The reflection mirror includes a reflection film formed such that the reflection factor is gradually changed in a sector manner. The irradiation position adjustment means includes a reflection mirror rotation unit for rotating the reflection mirror. By the rotation of the reflection mirror with the reflection mirror rotation unit, a position at which the light beam is irradiated onto the reflection film can be changed. If the rotation axis of the cylinder is set to be shifted relative to the optical axes of the optical fibers and the reflection factor of the reflection mirror is gradually changed in a sector manner, then incidence points of light beams emitted from the optical fibers on the reflection mirror are changed with the rotation of the cylinder and therefore optical reflection amounts are changed. Thus, it is possible to change optical attenuation between the optical fibers.

A variable optical attenuator according to the present invention further comprises a half mirror arranged between the beam converging means and the reflection mirror and reflecting part of the light beam to thereby output a monitor light beam; and a photo detector receiving the monitor light beam.

A variable optical attenuator according to the present invention comprises a first optical fiber; a reflection mirror reflecting a light beam emitted from an end face of the first optical fiber; a second optical fiber arranged parallel to the first optical fiber, on which second optical fiber the emitted light beam reflected by the reflection mirror is incident; and incidence angle adjustment means for adjusting an incidence angle of the light beam at which the light beam is incident on the reflection mirror. The variable optical attenuator according to the present invention further comprises beam converging means, arranged between the end face and the reflection mirror, for converging the light beam emitted from the end face onto the reflection mirror. Here, the incidence angle adjustment means comprises a cylinder housing the reflection mirror; and a box-shaped body housing the first optical fiber and the second optical fiber and housing the cylinder. The reflection mirror is housed in the cylinder so as not to be perpendicular to a center line of an inner diameter. The angle is adjusted by rotating the cylinder inside the box-shaped body.

The cylinder, to which the reflection mirror is fixed, has a wedge-shaped cross-section. If the center line of the hole provided in the box-shaped member is inclined toward optical axes of the two optical fibers, the incidence angle on the reflection mirror fixed to the cylinder is changed while the cylinder is rotated within the hole of the box-shaped member. As a result, a shift degree of the optical axis from one of the optical fibers to the other optical fiber is changed with the rotation of the cylinder, thereby changing the optical coupling amount between the optical fibers. In other words, it is possible to change the optical attenuation between the optical fibers by the rotation of the cylinder.

An optical signal source for wavelength-multiplexed optical transmission systems according to the present invention comprises a plurality of optical signal sources emitting light beams having different wavelengths; variable attenuators arranged in front of the plurality of optical signal sources, respectively, for attenuating the light beams and outputting attenuated light beams, respectively; and a optical coupler composing light beams outputted from the optical fibers. By arranging the variable optical attenuators of the present invention in front of the respective optical signal sources, it is possible to realize an optical signal source for wavelength-multiplexed optical transmission systems having excellent mountability and excellent adjustment facility.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

The variable optical attenuator according to the present invention will be described with reference to the accompanying drawings.

Figure 1:
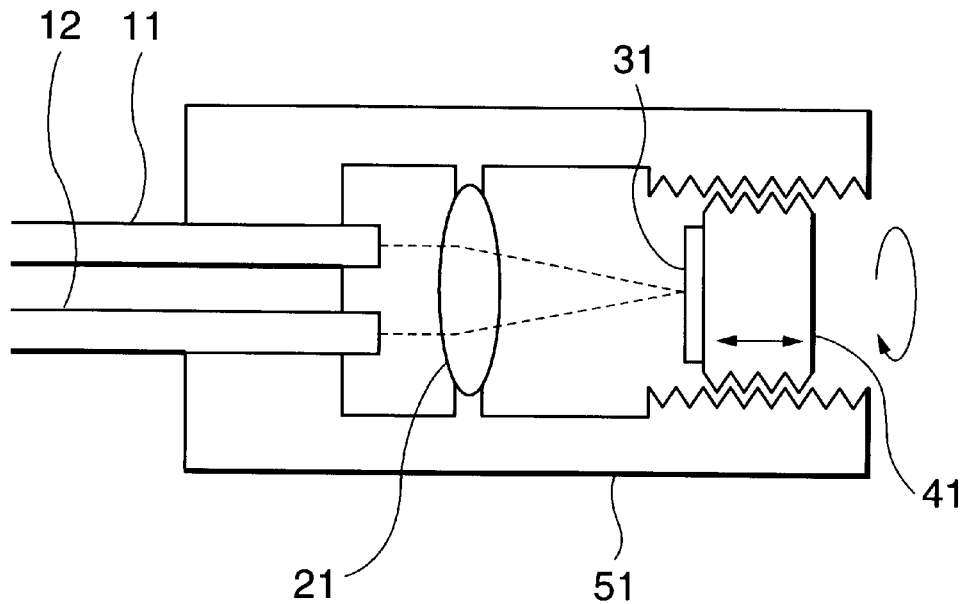
FIG. 1 shows the structure of a variable optical attenuator in the first embodiment according to the present invention.

FIG. 1 shows the structure of the variable optical attenuator in the first embodiment according to the present invention. A light beam incident on an optical fiber 11 is converged onto a lens 21. After the optical path is returned at a reflection mirror 31, the light enters an optical fiber 12.

The reflection mirror 31 is fixed to a cylinder 41. The cylinder is inserted into the hole of a box-shaped member 51. The cylinder 41 and the box-shaped member 51 are fitted into each other by screws. By rotating the cylinder 41, the distance r between the optical fibers 11, 12 and the reflection mirror 31 varies. If the distance r varies, a optical path length from the optical fiber 11 to the optical fiber 12 varies. Therefore, the optical coupling efficiency, i.e., optical attenuation between the optical fibers 11 and 12 varies. If the optical fibers 11 and 12 are coupled by a parallel beam, a variation in the optical attenuation relative to the distance r is small. If the optical fibers 11 and 12 are coupled by a converging beam converging beams at an intermediate point between the optical fibers 11 and 12, it is possible to increase an optical attenuation variation relative to the distance r.

To adjust the rotation angle of the cylinder 41, there are, for example, adjustment means with, for example, a screw driver by providing minus type or plus type grooves on the surface of the cylinder, on which the reflection mirror is installed, and on the surface opposed thereto, respectively, and adjustment means by lengthening the cylinder and providing tongues on end portions thereof.

The structure of the first embodiment according to the present invention will be described with reference to FIG. 1. Single mode fibers may be used for the optical fibers 11 and 12. The reflection mirror 31 may be formed of a glass plate deposited with a metal film or coated with a dielectric multi-layer film. The lens 21 is adjusted such that when the reflection mirror 31 is on a preset reference position, a light beam incident on the optical fiber 11 is converged onto the reflection mirror 31. Due to this, the optical fibers 11 and 12 are coupled by a converging beam system, and it is therefore possible to increase a variation in optical attenuation relative to a variation in the position of the reflection mirror 31. The reference position of the reflection mirror 31 as described above corresponds to the position of the cylinder 41 which can be arbitrarily determined to be provided inside the hole of the box-shaped member 51.

Figure 2:
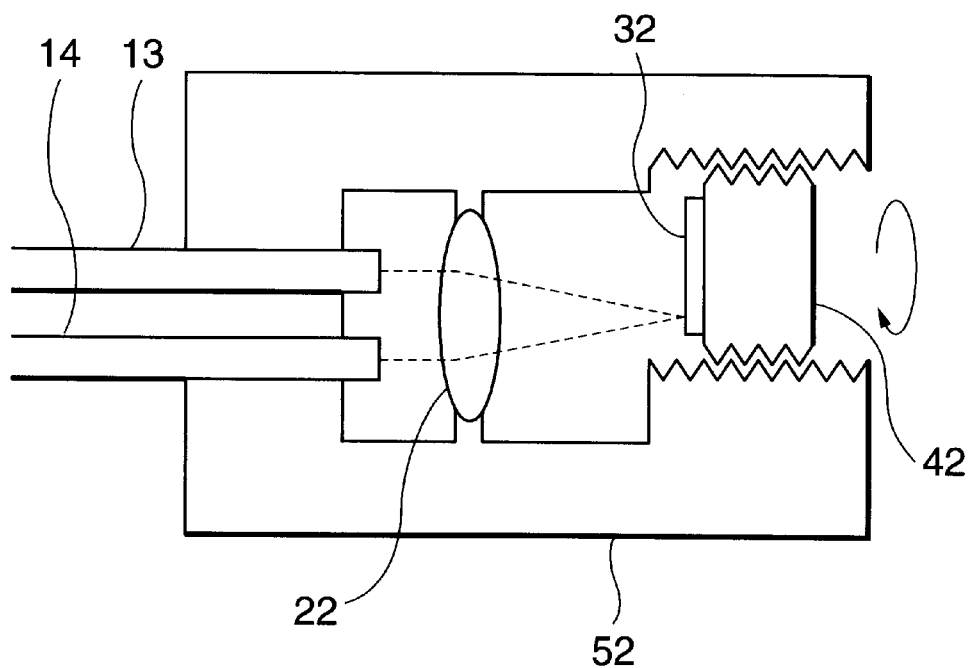
FIG. 2 shows the structure of a variable optical attenuator in the second embodiment according to the present invention.
Figure 3:
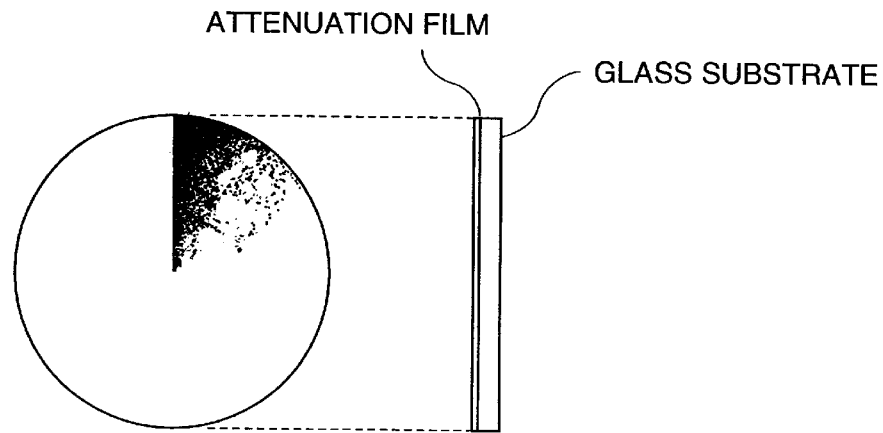
FIG. 3 shows the structure of a reflection mirror employed in the second embodiment shown in FIG. 2.

FIG. 2 shows the structure of a variable optical attenuator in the second embodiment according to the present invention. A light beam incident on the optical fiber 13 is converged onto a lens 22. After the optical path is returned at a reflection mirror 32, the light beam enters the optical fiber 14. The reflection mirror 32 is fixed to the cylinder 42. The cylinder 42 is inserted into the hole of a box-shaped member 52. The reflection mirror 32 is made such that a reflection factor varies in a sector manner as shown in FIG. 3. The rotation axis of the mirror 32 and the light incidence point are set to have a certain distance. By so doing, if the cylinder 42 is rotated and the light incidence point on the reflection mirror 32 is changed, then the light reflection factor is changed to thereby vary optical attenuation.

Single mode fibers may be used for the optical fibers 13 an 14. The reflection mirror 32 may be formed of a glass plate deposited with a metal film.

Figure 4:
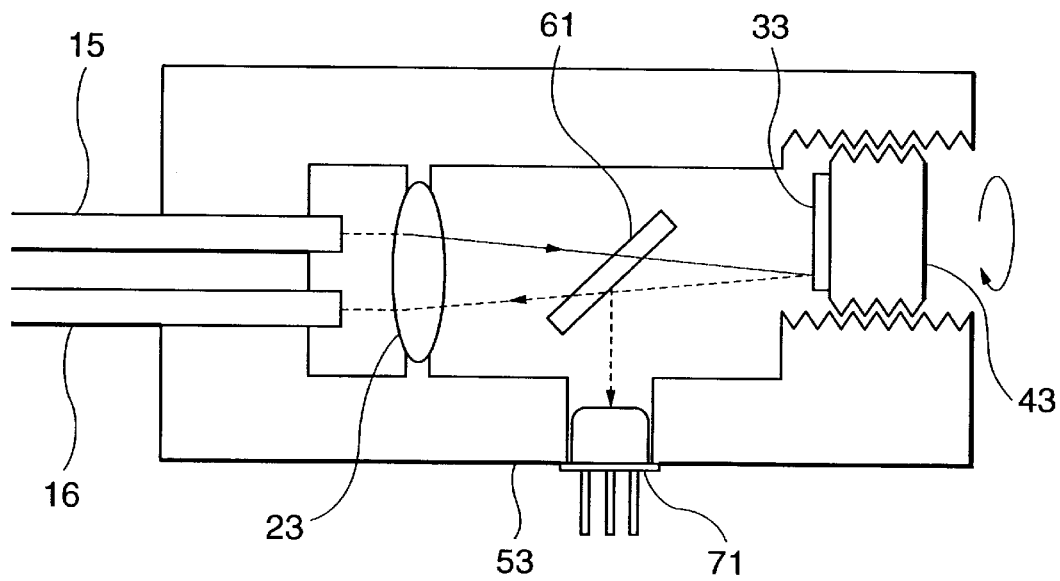
FIG. 4 shows the structure of a variable optical attenuator in the third embodiment according to the present invention.

FIG. 4 shows the structure of a variable optical attenuator in the third embodiment according to the present invention.

A light beam incident on an optical fiber 15 is converged onto a lens 23. After the optical path is returned at a reflection mirror 33, the light beam enters an optical fiber 16. The reflection mirror 33 is fixed to a cylinder 43. The cylinder 43 is inserted into the hole of a box-shaped member 53. The reflection mirror 33 is made to have a reflection factor varying in a sector manner. The rotation axis of the mirror 35 and the light incidence point are set to have a certain distance.

A half mirror 61 is inserted between the lens 23 and the reflection mirror 33. Part of the light beam reflected by the reflection mirror 33 is introduced to a photoreceptor 71. The power of the light beam incident on the photoreceptor 71 is proportional to that combined with the optical fiber 16. Due to this, by observing the output of the photoreceptor 71, it is possible to monitor the optical power outputted from the optical fiber 16. The output optical power monitoring function is useful if optical attenuation is adjusted for the maintenance of the apparatus.

The half mirror 61 may be formed of a glass plate coated with a metal film or a dielectric multi-layer film. A PIN-PD may be employed as the photoreceptor 71.

Figure 5:
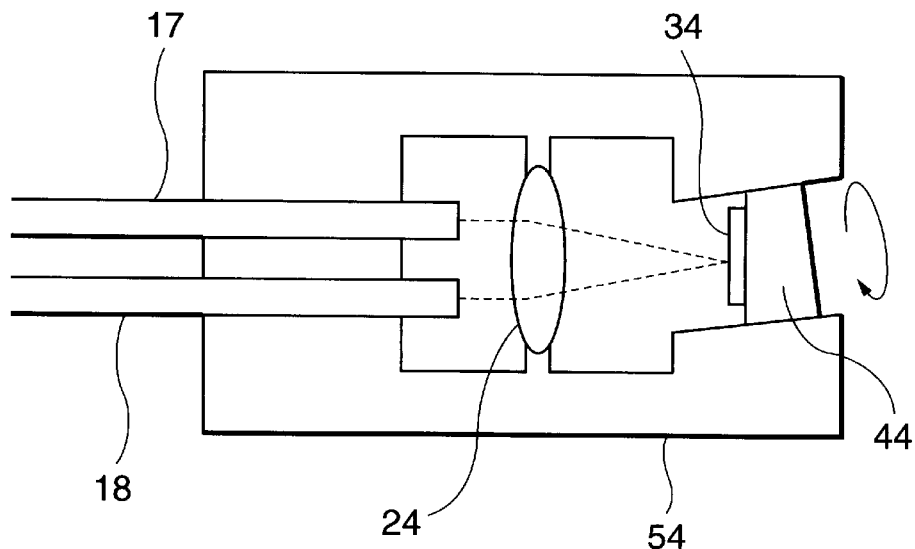
FIG. 5 shows the structure of a variable optical attenuator in the fourth embodiment according to the present invention.

FIG. 5 shows the structure of a variable optical attenuator in the fourth embodiment according to the present invention.

A light beam incident on an optical fiber 17 is converged onto a lens 24. After the optical path is returned at a reflection mirror 34, the light beam enters an optical fiber 18. The reflection mirror 34 is fixed to a cylinder 44. The cylinder 44 is inserted into the hole of a box-shaped member 54. The cylinder 44 has a cross-section processed into a wedge shape. The reflection mirror 34 is fixed inclined to the central axis of the cylinder 44. The center line of the hole of the box-shaped member 54 is inclined to the optical axes of the optical fibers 17 and 18. Due to this, by rotating the cylinder 44, the incidence angle and reflection angle of the light beam toward the optical fiber 18 continuously vary. As a result, the optical axis toward the optical fiber 18 is changed. Because of a shift in the optical axis, the amount of the light coupled to the optical fiber 18 varies with the rotation of the cylinder 44 and the light attenuation between the optical fibers 17 and 18 varies.

Single mode fibers may be used as the optical fibers 17 and 18. The reflection mirror 34 may be formed of a glass plate deposited with a metal film or coated with a dielectric multi-layer film.

Next, the structure of an optical signal source for wavelength-multiplexed optical transmission systems will be described.

Figure 6:
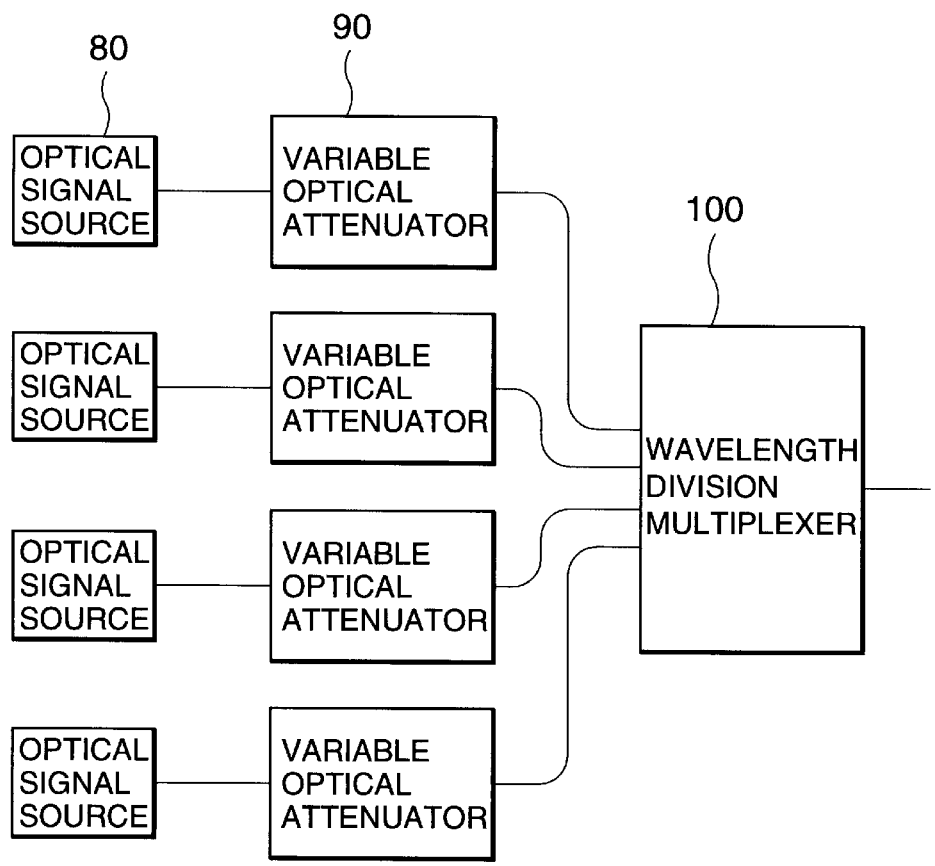
FIG. 6 shows the structure of a wavelength-multiplexed optical transmission system employing the variable optical attenuator according to the present invention.

FIG. 6 shows the structure of an optical signal source for wavelength-multiplexed optical transmission systems employing the variable optical attenuator according to the present invention.

A plurality of optical signal sources 80 transmit light beams of different wavelengths, respectively. Variable optical attenuators according to the present invention are provided in front of the optical signal sources 80, respectively. Levels of the light beams emitted from the light sources 80 can be made equal and flattened by adjusting attenuations of the respective variable light attenuators. These light beams are composed by an wavelength division multiplexer 100.

The variable optical attenuator according to the present invention has the following advantages. Since it is possible to operate the rotation of the reflection mirror from a side opposing the fibers for receiving and emitting light beams, a light attenuation variation mechanism is not provided on a position perpendicular to the optical axes of the optical fibers. With such a structure, it is possible to mount variable light attenuators adjacent one another, i.e., to realize high-density mounting without clearances. For the same reason stated above, even if variable optical attenuators are mounted on, for example, the panel of the apparatus, it is possible to easily operate the variable light attenuators even after they have been mounted, by making a hole for operating the rotation of the reflection mirror in the panel of the apparatus.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A variable optical attenuator comprising:
   a first optical fiber;
   a reflection mirror reflecting a light beam emitted from an end face of said first optical fiber;
   a second optical fiber arranged parallel to said first optical fiber, on which second optical fiber said emitted light beam reflected by said reflection mirror is incident; and
   position adjustment means for adjusting a distance between said reflection mirror and said end face.

2. A variable optical attenuator according to claim 1, further comprising beam converging means arranged between said end face and said reflection mirror, for converging said light beam emitted from said end face onto said reflection mirror.

3. A variable optical attenuator according to claim 2, wherein said position adjustment means comprises:
   a cylinder housing said reflection mirror and having screws at an outer diameter thereof; and
   a box-shaped member housing said first optical fiber and said second optical fiber and having screws for fitting said cylinder into an inner diameter thereof, and wherein
   said distance is adjusted by rotating said cylinder.

4. A variable optical attenuator comprising:
   a first optical fiber;
   a reflection mirror reflecting a light beam emitted from an end face of said first optical fiber;
   a second optical fiber arranged parallel to said first optical fiber, on which second optical fiber said emitted light beam reflected by said reflection mirror is incident, and wherein
   said reflection mirror includes a reflection film having a reflection factor varying according to a light incidence position; and
   said variable optical attenuator further comprises irradiation position adjustment means for changing a position at which said light beam emitted from said end face is irradiated with said reflection mirror.

5. A variable optical attenuator according to claim 4, further comprising beam converging means, arranged between said end face and said reflection mirror, for converging said light beam emitted from said end face onto said reflection mirror.

6. A variable optical attenuator according to claim 5, wherein
   said reflection mirror includes a reflection film formed such that said reflection factor is gradually changed in a sector manner;
   said irradiation position adjustment means includes a reflection mirror rotation unit for rotating said reflection mirror; and by rotation of said reflection mirror with said reflection mirror rotation unit, a position at which said light beam is irradiated onto said reflection film, is changed.

7. A variable optical attenuator according to claim 6, further comprising:

a half mirror arranged between said beam converging means and said reflection mirror and reflecting part of said light beam to thereby output a monitor light beam; and a photoreceptor receiving said monitor light beam.

8. A variable optical attenuator according to claim 4, wherein said reflection mirror includes a reflection film formed such that said reflection factor is gradually changed in a sector manner;

said irradiation position adjustment means includes a reflection mirror rotation unit for rotating said reflection mirror; and by rotation of said reflection mirror with said reflection mirror rotation unit, a position at which said light beam is irradiated onto said reflection film is changed.

9. A variable optical attenuator according to claim 8, further comprising:

a half mirror arranged between said beam converging means and said reflection mirror and reflecting part of said light beam to thereby output a monitor light beam; and a photoreceptor receiving said monitor light beam.

10. A variable optical attenuator comprising:

a first optical fiber;

a reflection mirror reflecting a light beam emitted from an end face of said first optical fiber;

a second optical fiber arranged parallel to said first optical fiber, on which second optical fiber said emitted light beam reflected by said reflection mirror is incident; and incidence angle adjustment means for adjusting an incidence angle of said light beam at which said light beam is incident on said reflection mirror.

11. A variable optical attenuator according to claim 10, further comprising beam converging means, arranged between said end face and said reflection mirror, for converging said light beam emitted from said end face onto said reflection mirror.

12. A variable optical attenuator according to claim 11, wherein said incidence angle adjustment means comprises:

a cylinder housing said reflection mirror; and a box-shaped body housing said first optical fiber and said second optical fiber and housing said cylinder, and wherein said reflection mirror is housed in said cylinder so as not to be perpendicular to a center line of an inner diameter, and said angle is adjusted by rotating said cylinder inside said box-shaped body.

13. A variable optical attenuator according to claim 10, wherein said incidence angle adjustment means comprises:

a cylinder housing said reflection mirror; and a box-shaped body housing said first optical fiber and said second optical fiber and housing said cylinder, and wherein said reflection mirror is housed in said cylinder so as not to be perpendicular to a center line of an inner diameter, and said angle is adjusted by rotating said cylinder inside said box-shaped body.

14. An optical signal source for wavelength-multiplexed optical transmission systems comprising:

a plurality of optical signal sources emitting light beams having different wavelengths;

reflection mirrors for reflecting the light beams emitted from said plurality of optical signal sources, respectively;

optical fibers arranged parallel to optical axes of the light beams emitted from said plurality of optical signal sources, on which optical fibers said emitted light beams reflected by said reflection mirrors are incident, respectively;

position adjustment means for adjusting distances between said reflection mirrors and said optical signal sources, respectively; and a photo-coupler composing light beams outputted from said optical fibers.

15. An optical signal source for wavelength-multiplexed optical transmission systems comprising:

a plurality of optical signal sources emitting light beams having different wavelengths;

variable attenuators arranged in front of said plurality of optical signal sources, respectively, for attenuating said light beams and outputting attenuated light beams, respectively; and a photo-coupler composing light beams outputted from said optical fibers.

16. An optical signal source for wavelength-multiplexed optical transmission systems according to claim 15, wherein each of said variable attenuators comprises:

a first optical fiber;

a reflection mirror reflecting a light beam emitted from an end face of said first optical fiber;

a second optical fiber arranged parallel to said first optical fiber, on which second optical fiber said emitted light beam reflected by each of said reflection mirrors is incident; and position adjustment means for adjusting a distance between said reflection mirror and said end face.

17. An optical signal source for wavelength-multiplexed optical transmission systems according to claim 15, wherein each of said variable attenuators comprises:

a first optical fiber;

a reflection mirror including a reflection film having a reflection factor varying according to a position on which the light beam is incident;

a second optical fiber arranged parallel to said first optical fiber, on which second optical fiber said emitted light beam reflected by said reflection mirror is incident; and irradiation position adjustment means for changing a position on which said light beam emitted from said end face is irradiated with said reflection mirror.

18. An optical signal source for wavelength-multiplexed optical transmission systems according to claim 15, wherein each of said variable attenuators comprises:

a first optical fiber;

a reflection mirror reflecting a light beam emitted from said end face;

a second optical fiber arranged parallel to said first optical fiber, on which second optical fiber said emitted light beam reflected by said reflection mirror is incident; and incidence angle adjustment means for adjusting an incidence angle of said light beam at which said light beam is incident on said reflection mirror.

* * * * *